(12) United States Patent
Rojahn (10) Patent No.: US 8,270,296 B2
(45) Date of Patent: Sep. 18, 2012

(54) DYNAMIC BANDWIDTH MANAGER

(75) Inventor: Tom O. Rojahn, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 1545 days.

(21) Appl. No.: 11/438,990

(22) Filed: May 23, 2006

(65) Prior Publication Data

US 2007/0070890 A1    Mar. 29, 2007

(30) Foreign Application Priority Data

Sep. 24, 2005    (GB) .................................. 0519521.9

(51) Int. Cl.
*G01R 31/08*    (2006.01)
(52) U.S. Cl. ........................................ 370/235; 370/468
(58) Field of Classification Search ........ 370/229–238.1, 370/252, 351, 356, 389, 392, 395.2–395.31, 370/395.4–395.52, 400–401, 428, 438–439, 370/465–468, 493–495, 508, 902–905, 61; 709/217–219, 222–229, 231
See application file for complete search history.

(56) References Cited

U.S. PATENT DOCUMENTS

| | | | | |
|---|---|---|---|---|
| 5,867,483 A * | 2/1999 | Ennis et al. | .................... | 370/252 |
| 6,438,141 B1 * | 8/2002 | Hanko et al. | .................... | 370/477 |
| 6,816,903 B1 | 11/2004 | Rakoshitz et al. | | |
| 6,848,004 B1 | 1/2005 | Chang et al. | | |
| 6,954,786 B1 * | 10/2005 | Vered et al. | .................... | 709/223 |
| 6,959,006 B1 * | 10/2005 | Sarnikowski et al. | ........ | 370/468 |
| 6,959,436 B2 * | 10/2005 | Peng | .............................. | 719/310 |
| 7,313,626 B2 * | 12/2007 | Sabat et al. | ..................... | 370/338 |
| 7,430,221 B1 * | 9/2008 | Kovacs et al. | .................. | 370/477 |
| 7,567,575 B2 * | 7/2009 | Chen et al. | ..................... | 370/401 |
| 7,577,161 B2 * | 8/2009 | Li et al. | .......................... | 370/468 |
| 2003/0001897 A1 * | 1/2003 | Meandzija et al. | ............ | 345/772 |
| 2004/0148423 A1 * | 7/2004 | Key et al. | ....................... | 709/235 |
| 2004/0213197 A1 * | 10/2004 | Zimmerman et al. | ........ | 370/346 |
| 2005/0021726 A1 | 1/2005 | Denoual | | |

FOREIGN PATENT DOCUMENTS

EP    1 523 154 A1    10/2003

* cited by examiner

*Primary Examiner* — Ricky Ngo
*Assistant Examiner* — Phuongchau B Nguyen
(74) *Attorney, Agent, or Firm* — Hoffman Warnick LLC (57) ABSTRACT

A dynamic bandwidth manager for determining the bandwidth available to an IP connected client device, the IP connected client device requesting access to multimedia resources from a service provider, the dynamic bandwidth manager comprising: a receiving component for receiving an IP address of an IP connected client requesting access to a resource; a requesting component for locating a nearest managed device to the IP connected client and requesting a current network management data set pertaining to the IP connected client from the located managed device; a calculation component for retrieving a previously stored set of network management data pertaining to the IP connected client and for analysing the network management data sets, in dependence on the current network management data set and the previously stored network management data sets, to calculate the available bandwidth capacity of the IP connected client.

20 Claims, 7 Drawing Sheets

Fig. 1

Prior art

DYNAMIC BANDWIDTH MANAGER

REFERENCE TO PRIOR APPLICATION

The current application claims the benefit of co-pending British Patent Application No. 0519521.9, filed on Sep. 24, 2005, which is hereby incorporated herein by reference.

FIELD OF THE INVENTION

The invention relates to the field of bandwidth management. In particular, the invention relates to a dynamic bandwidth manager for determining the bandwidth capacity available to a subscriber of a service, independent of the deployed network infrastructure.

BACKGROUND OF THE INVENTION

Media services providing rich media bandwidth consuming services, such as video unicast streams and TV (television) multicast streams, are heavily dependent on the bandwidth capability of the network infrastructure in order to deliver services of the best quality.

A video stream can be delivered in several qualities from basic 500 Kbytes up to a DVD (digital versatile disc) or HDTV (high definition television) quality (>20 Mbps) provided the required bandwidth is available. Often, networks are implemented on the OSI (open systems interconnection) layer 3 to ensure that a minimum bandwidth capability is available at the edge of the network to ensure that a subscriber is not consuming more bandwidth than that to which the subscriber has subscribed. However, no solutions exist that address the problem when the subscriber has exhausted the current available bandwidth.

In a scenario where a subscriber requests more than one video stream and the available bandwidth can only deliver one video stream, a centralised video service can ensure the user does not receive more bandwidth than that to which they have subscribed.

But, in a scenario where the subscriber performs its own subscription management, there is a possibility to offer a service in which the subscriber has available two video streams but within the requestor's current bandwidth subscription. Meaning, the subscriber would not be required to increase its bandwidth subscription in order to receive the two available video streams, but the subscriber would, in fact, receive the two video streams at a lower resolution, i.e., a resolution that 'fits' the subscriber's current bandwidth subscription.

Unfortunately, the above situation is complicated further if the same subscriber, in parallel to the video service, also utilises some peer-to-peer traffic from its PC (personal computer) that 'fills up' the current available bandwidth. Thus, the video server 'thinks' it knows the bandwidth capability of the subscriber's 'bandwidth pipe' based on the subscriber's current bandwidth subscription and selects a 'too good' resolution without taking into account the fact that the PC has, for example, already consumed 25% of the available bandwidth.

One prior art solution is offered by EP 1523154 in which a method and system for offering push services to a mobile user using a push proxy which monitors the state of the mobile user equipment. The system comprises an application server which adapts the representation of the content data or the form in which the content data is communicated to the mobile user. A disadvantage of this system is that it is dependent on a specific application code set operating on the requestor's client device and thus requires dependency of a client application and general availability and support from manufactures.

Another solution can be found with reference to U.S. Ser. No. 06/848,004. Again, although the system adapts the content of the data to be transmitted to the requestor in dependence on the requestor's available bandwidth, the system relies on an application, i.e., Hot Media, on the client device and a specific data content data type. Thus, this solution is not suitable for an open standard network, and because a special application is required on the client in order to obtain data pertaining to network traffic, a certain amount of communication has to take place between the controller and the client. This communication uses bandwidth resources.

A further solution is described with reference to US 2005/0021726. A set of transcoding methods and complex algorithms are deployed to determine the bit rate over a particular network bandwidth pipe.

Thus, a lot of prior art exists that addresses the problem of adapting data content to an available bandwidth pipe. But all known prior art solutions either depend on specific networks, i.e., GPRS (general packet radio service), GSM (global system for mobile communications), etc., which have a more limited and expected bandwidth and/or specific code implemented and/or a specific file format architecture.

DISCLOSURE OF THE INVENTION

The current and future markets are aiming at solutions that operate over multiple network technologies and that do not require specific code other than standard applications which the majority of PC's already have installed—such as an HTML (hyper text markup language) browser, a media player, etc. It is an object of the present invention to propose a solution to the above aforementioned problem.

Thus, viewed from a first aspect, the present invention provides a dynamic bandwidth manager for determining the bandwidth available to an IP (internet protocol) connected client device, the IP connected client device requesting access to multimedia resources from a service provider, the dynamic bandwidth manager comprising: a receiving component for receiving an IP address of an IP connected client requesting access to a resource; a requesting component for locating a nearest managed device to the IP connected client and requesting a current network management data set pertaining to the IP connected client from the located managed device; a calculation component for retrieving a previously stored set of network management data pertaining to the IP connected client and for analysing the network management data sets, in dependence on the current network management data set and the previously stored network management data sets, to calculate the available bandwidth capacity of the IP connected client.

Advantageously, the present invention provides for the calculation of bandwidth consumed by an IP connected client and the available bandwidth. Advantageously, network management data is collected from SNMP (simple network management protocol) managed devices. The data is collected from a SNMP managed device nearest to the IP connected client in order to obtain data that is representative of the network activity of the IP connected client. Because SNMP is an existing protocol standard and deployed by the majority of networks, the invention only requires the installation of the dynamic bandwidth manager in a proxy server or other suitable location. No adaptation to hardware or software is required on the IP connected client devices. Thus, this advantage makes the present invention highly suitable for future open standard networks, such as broadband, and services, such as IPTV (internet protocol television), where multiple digital data streams will be piped into households over many disparate and separate networks.

Further, known solutions are all dependent on the capabilities of each network component and its supported OSI level, i.e., OSI layer 2 has less capability that OSI level 3. With the dynamic bandwidth manager, bandwidth determination and management is centralised, independent of each component's capability and supported OSI level. Thus, providing the advantage of knowing what bandwidth has been used, the available bandwidth to an IP connected client and other network contentions, without having to contact the client to determine this information and hence not using valuable bandwidth resources in the process of performing this service, unlike prior art solutions which contribute to loss of precious bandwidth resources.

The dynamic bandwidth manager allows the management of requests from IP connected clients from a central proxy service, providing the advantage of knowing about network contention, bandwidth resources used and the available bandwidth.

Preferably, the dynamic bandwidth manager provides for the requesting component sending a request to an SNMP agent located at the nearest managed device for requesting network management data located in a management information database.

Preferably, the network management data set comprises the number of octets received and transmitted by the requesting IP address over a given time period.

Preferably, the network management information further comprises local knowledge of the network type and bandwidth capacity of the network type.

Preferably, the requestor component further comprises a limiter for determining the relevance of the previously stored network management data set.

Preferably, the limiter disregards the previously stored network management data set if the limiter determines that the network management data set does not meet a predefined criterion.

Preferably, in response to the calculated available bandwidth, the requested resource's data content is adapted to fit the available bandwidth pipe for the requested IP connected client.

Preferably, the nearest managed device is a SNMP managed device and the network managed information is stored in a MIB (management information base).

Preferably, the nearest managed device is a residential gateway and/or an ADSL (asymmetric digital subscriber line) router.

Preferably, the dynamic bandwidth manager communicates with a transcoding component in order for the transcoding component to adapt the multimedia content of the requested resource.

Preferably, a calculation component calculates the available bandwidth by calculating the following algorithm: current(ifInOctets−previous ifInOctets)+(current ifOutOctets−previous ifOutOctets)*8/(current timestamp−previous timestamp).

Viewed from a second aspect, the present invention provides a method for determining the bandwidth available to a subscriber of a multimedia service in a heterogenous computing network, the subscriber requesting access to multimedia services through an IP connected client, the method comprising the steps of: receiving an IP address of an IP connected client requesting access to a resource; locating a nearest managed device to the IP connected client and requesting a current network management data set pertaining to the IP connected client from the located managed device; retrieving a previously stored set of network management data pertaining to the IP connected client; and analysing the network management data sets, in dependence on the current network management data set and the previously stored network management data sets, to calculate the available bandwidth capacity of the IP connected client.

Viewed from a third aspect, the present invention provides a computer program product loadable into the internal memory of a digital computer, comprising software code portions for performing, when said product is run on a computer, the invention as described herein.

Viewed from a fourth aspect, the present invention provides a multimedia content providing service for providing real-time digital data streams to subscribers of multimedia services, comprising: receiving a request for a multimedia service from a subscriber and determining the IP address of the requesting subscriber; locating the requesting subscriber's nearest managed device and requesting network management data pertaining to the IP address of the subscriber from the located managed device; retrieving a previously stored set of network management data pertaining to the IP address of the requesting subscriber; and analysing both sets of network management data, in dependence on the current network management data and the previously stored network management data set to calculate the available bandwidth capacity of the IP connected client.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
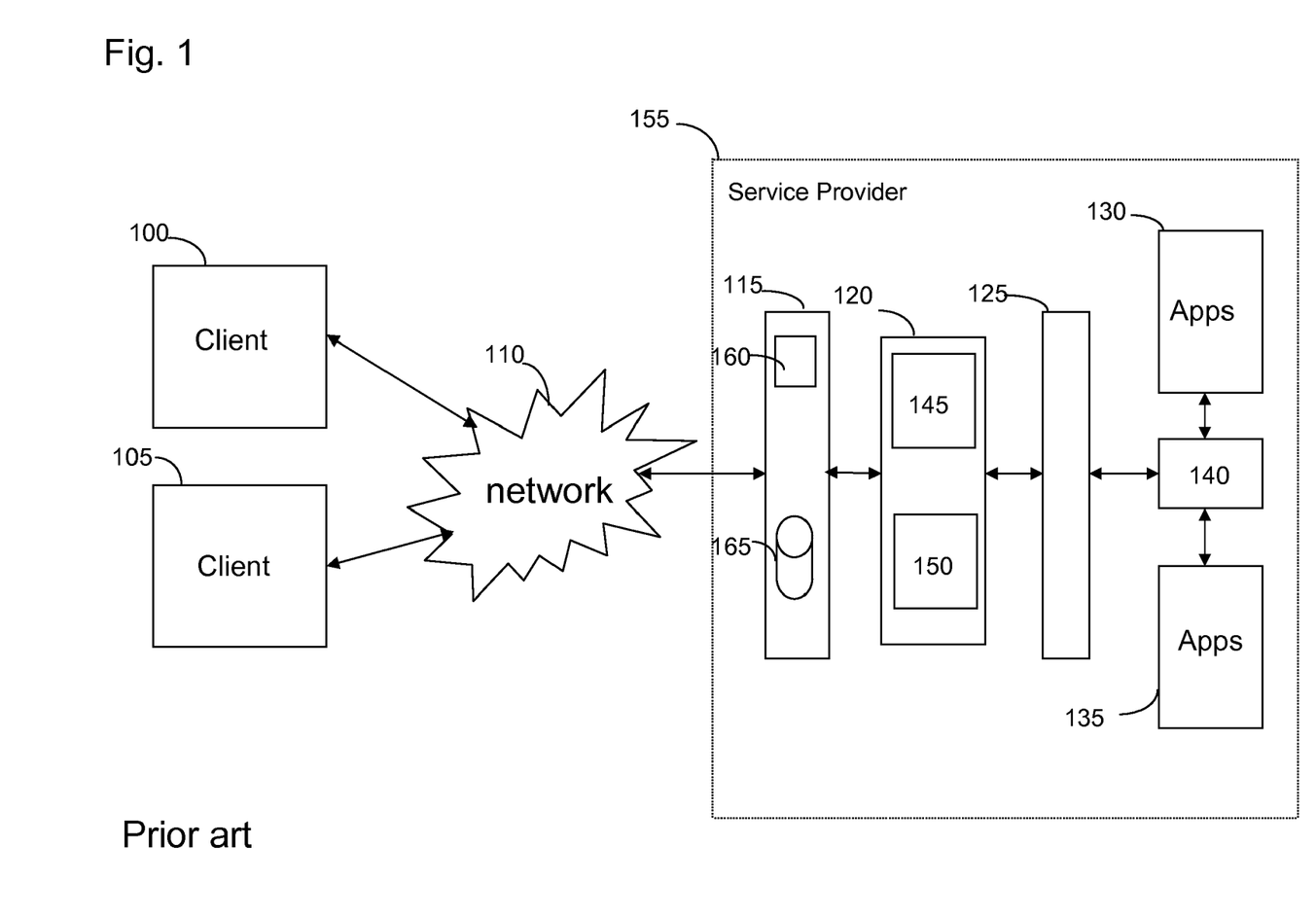
FIG. 1 shows a distributed computing environment as is known in the art.

FIG. 1 is a representation of a distributed computing architecture that is typical of a heterogenous multimedia computing environment. A number of client devices 100, 105 connect to a network 110, such as the Internet. The client devices 100, 105 may comprise a number of different computing devices such as personal computers, set top TV boxes, 3G mobile phones, gaming machines, etc. Client devices 100, 105 request access to resources, such as multimedia applications comprising web services, music services and video on-demand services, for example. Typically, the client interacts with the network by utilising one of the protocols within the OSI protocol stack, for example, via HTTP (hypertext transfer protocol) within the OSI application layer of TCP (transmission control protocol) within the transport layer. The network may comprise any network type, for example, a local area network, a wide area network, a metropolitan network, a wireless network and an internetwork. Each network type comprises its own characteristics, for example, a local area network comprises a range of 1-2 KM with a bandwidth capacity of 10-1000 Mbps and a latency of 1-10 ms.

Multimedia applications can be defined as applications which demand the timely delivery of a stream of multimedia data to subscribers via client devices 100, 105. Multimedia applications are often highly distributed and operate within general purpose distributed computing environments. Because of this—multimedia applications compete with other multimedia applications for network bandwidth and computing resources on the client device 100, 105.

Each client device 100, 105 comprises software for allowing a user to specify a request for a resource. For example, the software may comprise a conventional web browser, a media player and/or an interactive application on TV set top box, etc.

In order to access a requested resource, the client devices 100, 105 transmit, via a software application, a request for a resource to the service provider 155. The service provider 155 locates the request and, providing that the requestor's subscription allows the request for the resource, transmits the requested resource back to the requestor. The service provider manages a network of application servers 130, 135, firewall 115, proxy servers 120, routers 125, gateways, etc. Each device managed by the service provider 155 comprises an SNMP (simple network management protocol) agent 160. SNMP enables the exchange of management information between network devices and forms part of the TCP/IP protocol set in the OSI application layer.

The SNMP agent 160 interacts with a management information database 165 (MIB) to store the monitored and collected management information about network devices. The MIB 165 comprises a list of managed network devices, for example, a list of the application servers 130, 135, firewalls 115, proxy servers 120 and routers 125. The MIB 165 stores information regarding the number of Octets being received by the SNMP agent's managed device as well as the number of Octets transferred from the SNMP agents' managed device. The SNMP agent 160 uses terms such as 'get' and 'push' to retrieve and add information to the database 165.

A firewall application 115 monitors and controls the network traffic into and out of the local network of application servers 130, 135. The firewall 115 applies a set of processes that act as a gateway to the local network applying a security policy determined by an organisation. For example, is the request for a resource an authentic request for a resource?

On applying the security policy, the request is transmitted to a proxy server 120. The proxy server 120 may comprise an authentication component 145, which authenticates that the requestor's request meets with its subscription and a transcoding component 150 for adapting the requested resource such that it can be delivered in a suitable format to the user.

The proxy server 120 parses the request and routes the request to the application server 130, 135 containing the requested resource. The request may pass through a further firewall 125 before reaching the destination application server 130, 135. Further security policies are applied by the firewall 125 and the request is routed to a resource broker 140 which manages, monitors and routes the request to the appropriate application server 130, 135. On retrieving the requested resource, the requested resource is transmitted back to the proxy server 120 where the resource may be transcoded, by the transcoding component 150, into a format that meets with the requestor's subscription. For example, a standard TV Video stream requires more than 120 Mbps, which exceeds the capacity of a 100 Mbps Ethernet network. Thus, the transcoding component 150 adapts the 120 Mbps of TV Video stream to a lower quality, such that the request for the resource can be met by the service provider 155.

In some multimedia systems, a Quality of Service (QoS) management system (not shown) is deployed. A QoS management system manages all of the computing and communication resources needed to acquire, process and transmit multimedia data streams. QoS management systems are needed in order to guarantee that applications will be able to obtain the necessary quantity of resource at the required times, even when other applications are competing for a resource. Thus, QoS management systems do not solve the problem of how to effectively obtain a measure of the bandwidth capability of a multimedia network for a given request for a resource.

Now, consider a situation wherein client devices 100, 105 are roaming seamlessly between various networks 110 and each network 110 has variable bandwidth capabilities. Without bandwidth adapted content, users will experience a degraded response time from applications with high bandwidth requirements, unless the application is being informed about the limited bandwidth of the network 110 and can take proactive actions, like replacing large graphics with links, etc. As already explained, current bandwidth adapted content solutions entail installing specialised software on the client devices 100, 105. The specialised software is able to track resource requests and determine whether a request can be met by a user's current subscription or whether the content must be adapted. As previously discussed, this creates a number of disadvantages with respect to cost, and current solutions are specific to the specialised networks that they are operating in, which do not readily support the adoption of open standards.

Thus, in a preferred embodiment, the present invention provides a dynamic bandwidth manager (DBM) 210 (FIG. 2) for determining the current network bandwidth pipe for a particular TCP/IP connected client 100, 105.

Figure 2:
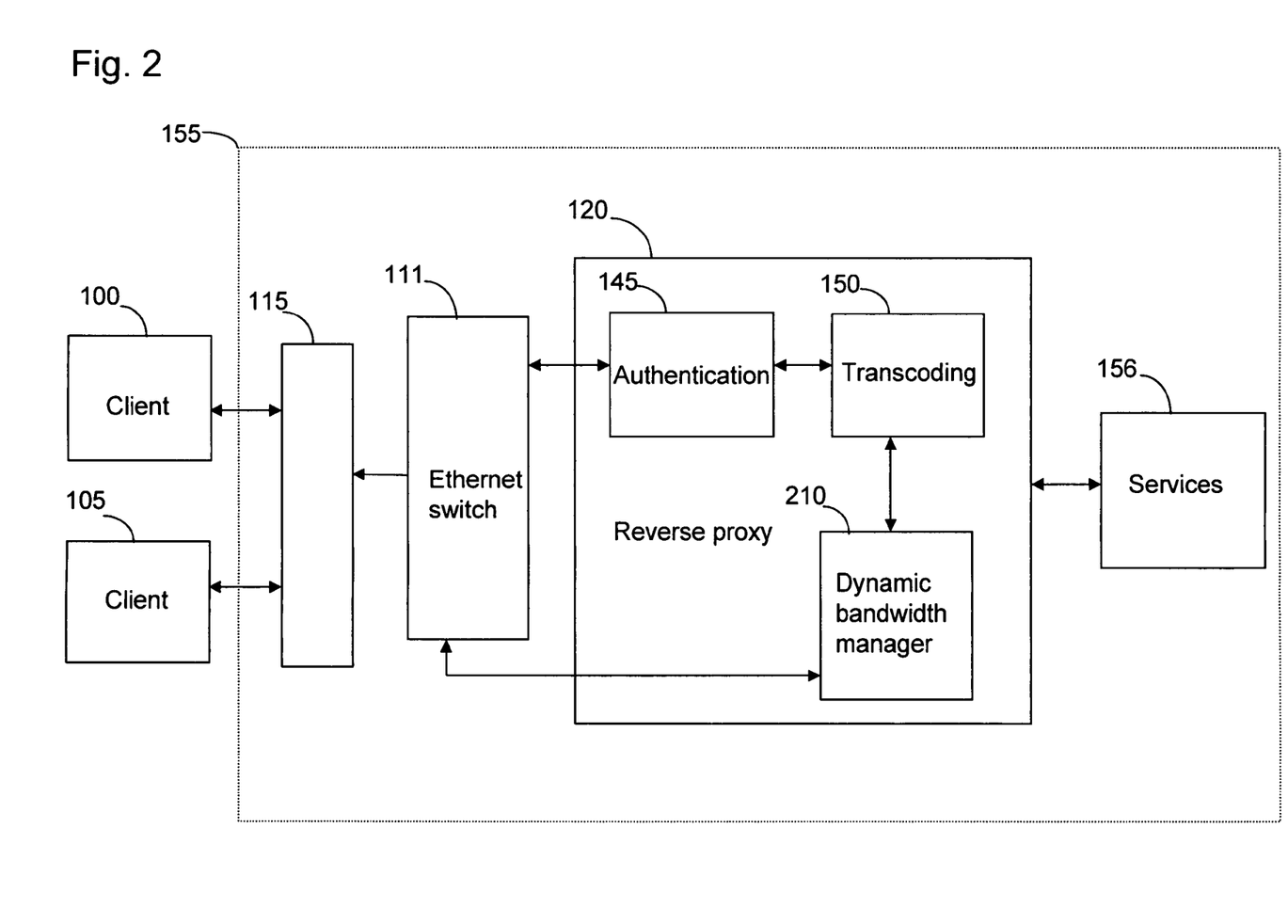
FIG. 2 illustrates the dynamic bandwidth manager implemented as a proxy server plug in, in accordance with a preferred embodiment of the invention.

With reference to FIG. 2, the DBM 210 is shown operating within the heterogenous computing environment of FIG. 1. The DBM 210 may be installed as a proxy plug-in component to an existing proxy server 120 or other available equivalent systems. The DBM 210 receives notification of a request for a resource from a requestor. The DBM 210 parses the request and extracts the requestor's IP address in order to request network management data from the MIB located at the nearest SNMP device to the requestor.

On receiving the network management data from the MIB 165 (FIG. 1), the DBM 210 analyses the data to determine the current bandwidth capacity of the requesting client's network pipe and transmits the final calculation to the transcoding component 150 for adapting the content.

In use, client devices 100, 105 transmit a request for a multimedia resource to the client's residential gateway 115. The residential gateway 115 forwards the request out into the network (e.g., via Ethernet switch 111) for receiving by a reverse proxy 120. An authentication component 145 stored on the reverse proxy 120 authenticates the request for the resource and sends an authentication response back to the requesting client 100, 105. The authentication component 145 transmits the request for the resource to the application server 130, 135. Once the resource is located, the resource is transmitted back to the reverse proxy 120 for processing by the transcoding component 150. The transcoding component 150 communicates a request to the DBM 210 to send the transcoding component 150 the calculated available bandwidth capacity for the requesting client 100, 105. Thus, the DBM 210 requests the IP address of the requested resource from the transcoding component 150 and asks the transcoding component to 'wait' before transcoding the requested resource.

The DBM 210 sends a request to the SNMP agent 160 (FIG. 1) located at the residential gateway(s) 115 nearest to the requesting client 100, 105, for the network management data pertaining to the requestor's IP address. The SNMP agent 160 performs a lookup in the MIB 165 (FIG. 1) and locates the managed object's ID and transmits the located SNMP data set back to the DBM 210 for processing. The DBM 210 analyses the data set and calculates the bandwidth available to the requesting device 100, 105 and sends the calculated remaining bandwidth to the transcoding component 150 in order for the transcoding component 150 to transcode the requested resource so that the request can be satisfied at the requesting client 100, 105.

Now consider another situation, where the 'last mile' of the network 110 is implemented as ADSL (asymmetric digital subscriber line). Limited bandwidth is a problem if the service requires high quality (near DVD) and/or Video-on-Demand and utilises current standard compression technology, for example, mpeg2 or 3). A multicast near DVD TV stream in mpeg 2 compression requires about 5 Mbps and is in theory the highest available bandwidth on short distance ADSL. In the near future, DSL and compression technologies like ADSL2+ and mpeg4 will enable all three services concurrently on the same 'wire'. But still, it will be a problem to manage the bandwidth as more than one stream will be required in parallel, for example, more than one TV in the same household. As well as peer-to-peer traffic that jams the network connection.

Figure 3:
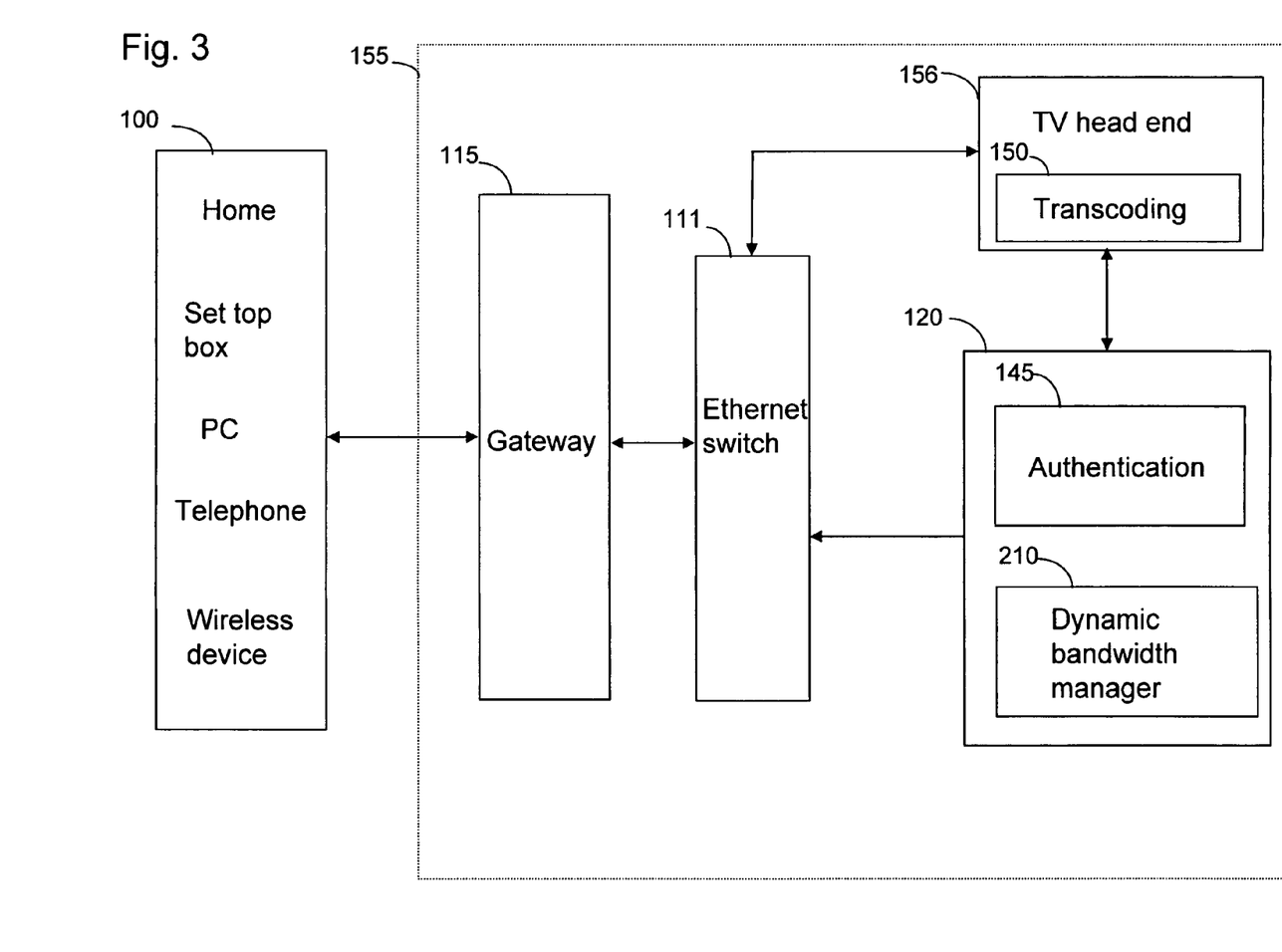
FIG. 3 illustrates the dynamic bandwidth manager implemented in a triple play environment, in accordance with a preferred embodiment of the invention.

Thus the DBM 210 overcomes this problem as is explained with reference to FIG. 3 which shows the DBM 210 implemented in a triple play solution. In this instance, the client 100, 105 is a home multimedia solution offering a digital set top box, a PC, voice over IP telephone system and numerous wireless devices for accessing multimedia content. Again, the client 100, 105 requests access to a resource through an access device, i.e., digital set top box, etc. The requested resource is transmitted to the client's residential gateway 115, wherein the requested resource is transmitted out into the network (e.g., via Ethernet switch 111). The authentication component 145, located on the reverse proxy 120, authenticates the resource request and transmits an authentication response back to the requesting client 100, 105. The reverse proxy 120 takes the request for the resource and locates the requested resource at, in this instance, the TV head end 156. In this instance, the transcoding component 150 of FIG. 2, is carried out at the TV head end 156 and the TV head end 156 requests from the DBM 210 the calculated available bandwidth for the requested client 100, 150. The TV head end 156, in response to the calculated available bandwidth, transcodes the requested resource and sends the adapted data content of the requested resource to the requesting client 100, 105.

Figure 4:
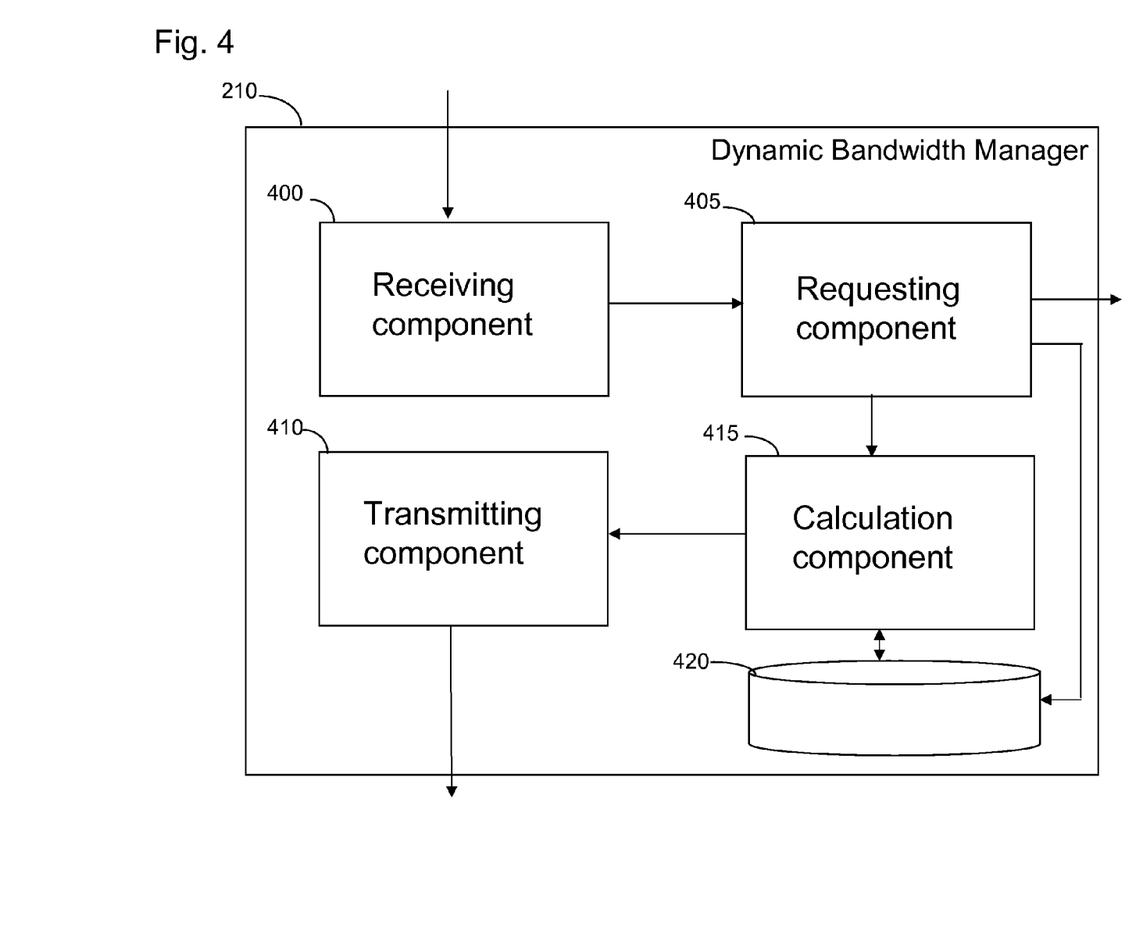
FIG. 4 is a block diagram showing the components of the bandwidth manager, in accordance with a preferred embodiment of the invention.
Figure 5:
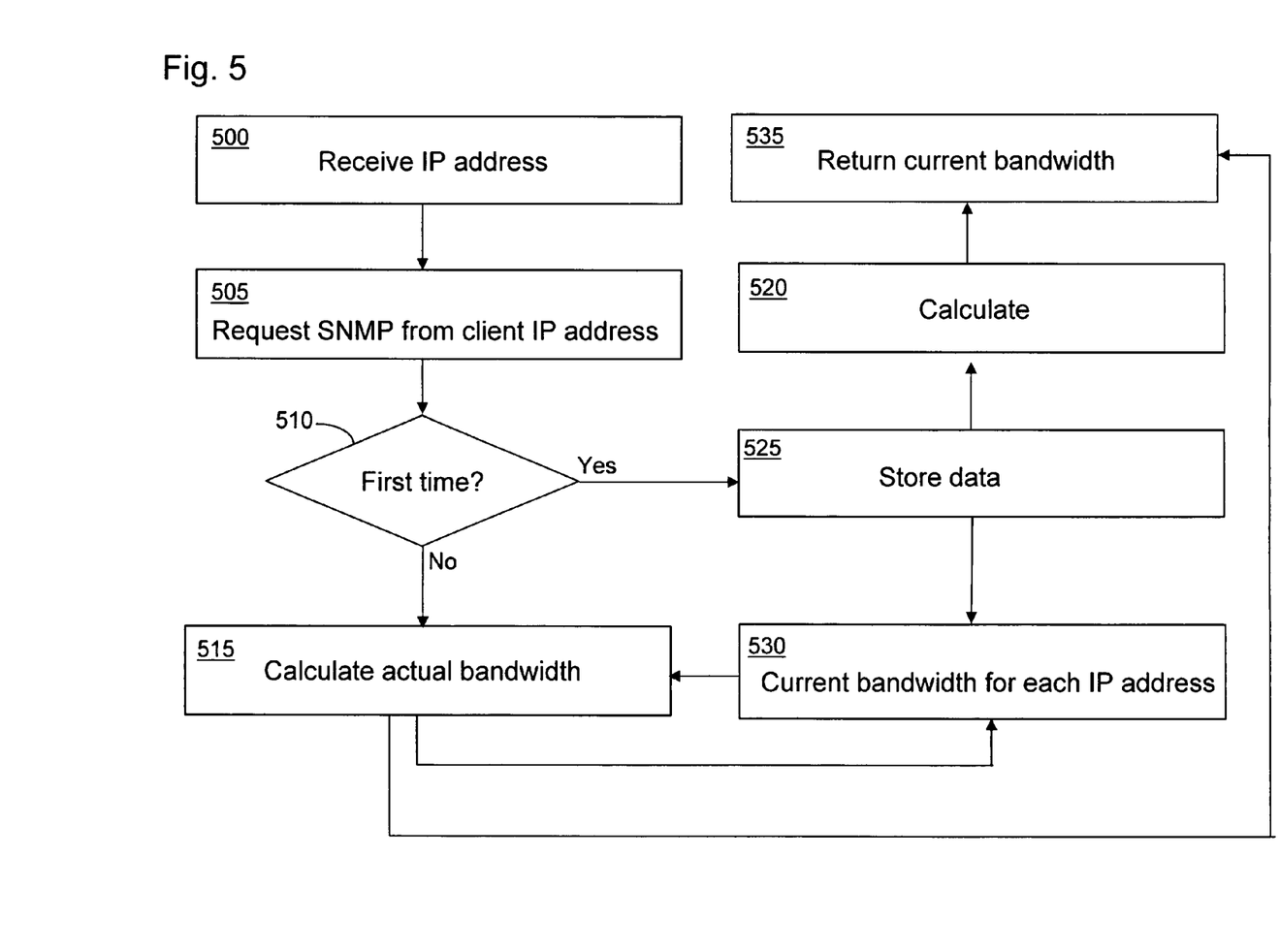
FIG. 5 is a flow chart detailing the operation steps of the bandwidth manager in accordance with a preferred embodiment of the invention.

Moving on to FIGS. 4 and 5, the DBM 210 is explained in greater detail. FIG. 4 details the components of the DBM 210 and FIG. 5 details the operational steps that each of the components perform in order to carryout a preferred embodiment of the present invention.

The DBM 210 comprises a number of components, namely, a receiving component 400, a requesting component 405, a transmitting component 410, a calculation component 415 and a data store 420.

The receiving component 400 receives a request from the transcoding component 150 for information pertaining to the available bandwidth for a particular IP connected client 100, 105 (step 500). As explained with reference to FIG. 2 and FIG. 3, the transcoding component 150 may be located on the reverse proxy 120 or as in a triple play environment, at the TV head end 156. The request comprises the IP address of the destination server 130, 135 and the IP address of the requesting client 100, 105. The receiving component 400 transmits the request to the requesting component 405. On receipt of the request, the requesting component 405 extracts the client IP address and transmits a message to the SNMP agent installed at the nearest SNMP managed node to the requesting client 100, 105, for example, an ADSL router or residential gateway, for the network management data pertaining to the network activity of the requesting client 100, 105 (step 505).

The requesting component 405 makes a determination to identify if this is the first time that the network management data has been requested for the requesting client 100, 105 (determination 510). If the determination is negative, i.e., this is the first time that SNMP data has been requested for the requesting IP address, the requesting component 405 creates an entry in the data store 420 for the IP address and the requested network management data (step 525).

A typical network management data set comprises the number of bytes of data received (ifInOctets), the number of bytes of data transmitted (ifOutOctets) and the speed of the current network connection, which also is an indication of the capability of the network (ifSpeed). As this is the first time network management data has been requested for this particular IP address, the ifInOctets, the ifOutOctets and the ifSpeed is determined as the current available bandwidth and is stored in the data store with the appropriate IP address SNMP records (step 520). The calculation component 415 transmits the calculated available bandwidth to the transmitting component 410 for transmitting to the transcoding component (step 535).

If, on the other hand the requesting component 405 determines this is not the first time network management data has been requested for the requesting IP address (determination 510), the requesting component 405 locates, within the data store, the most recently stored network management data pertaining to the requesting IP address and sends the data to the calculation component 415.

Preferably, a limiter is placed on how old the most recently stored data is. For example, if the most recently stored data is over 3 hours old then the limiter disregards the data as of no relevance. In this instance, the requesting component stores the requested network management data in the data store 420 (step 525) and calculates available bandwidth (step 520).

If the limiter does not disregard the most recently stored data, the data is communicated to the calculation component 415 along with the current network management data and the calculation component 415 begins to calculate the currently available bandwidth (step 515). The DBM 210 uses the following algorithm:

Current available bandwidth=(current ifInOctets−previous ifInOctets)+(current ifOutOctets−previous ifOutOctets)*8/(current timestamp−previous timestamp)

Thus, the above algorithm calculates the current available bandwidth in bits per second which is the standard way of representing bandwidth capacity.

Optionally, the calculation may be qualified with the current obtained speed from the requesting client's gateway. If the difference in the calculation (as in bits per second) and the estimated speed of the gateway is determined as being to bigger gap, the calculation will be recalculated with new SNMP data requested from the gateway (step 530).

With or without qualification, the calculated current bandwidth is transmitted to the transmitting component 410 for sending to the transcoding component (step 535).

Figure 6:
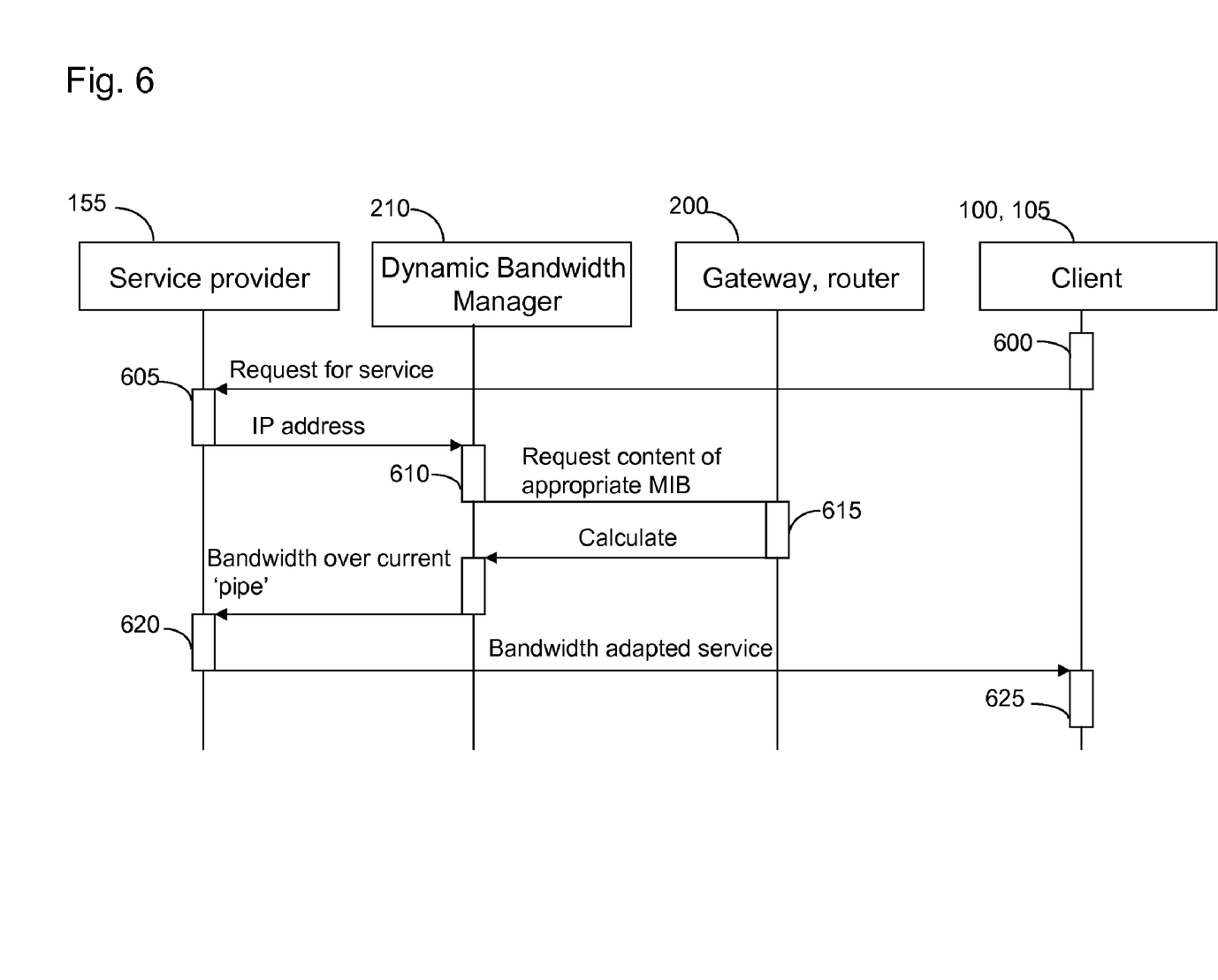
FIG. 6 is a sequence diagram showing the interaction steps of the bandwidth manager operating in a passive mode in accordance with a preferred embodiment of the invention.

FIG. 6 shows a sequence diagram of the interaction steps of the DBM 210 and the various components of a multi-media system. In this instance, the DBM 210 is operating in a passive mode.

The interaction sequence commences with the client 100, 105 sending a request for a resource to a service provider 155 (sequence steps 600 to 605). The IP address of the requesting client 100, 105 is transmitted to the DBM 210 (sequence steps 605 to 610). The DBM 210 requests from the requesting client's nearest SNMP managed node, i.e., the residential gateway or ADSL router 200, the network management data, located in the MIB (sequence steps 610 to 615). The DBM 210 receives the network management data (sequence steps 615 to 620) and follows the process steps of FIG. 5 and calculates the bandwidth available to the requesting client 100, 105. The DBM 210 transmits the current available bandwidth to the service provider 155 (sequence steps 620 to 625) who in response to the calculated available bandwidth transcodes the data content as necessary and transmits the adapted content to the requesting client 100, 105 (sequence steps 625 to 630).

Figure 7:
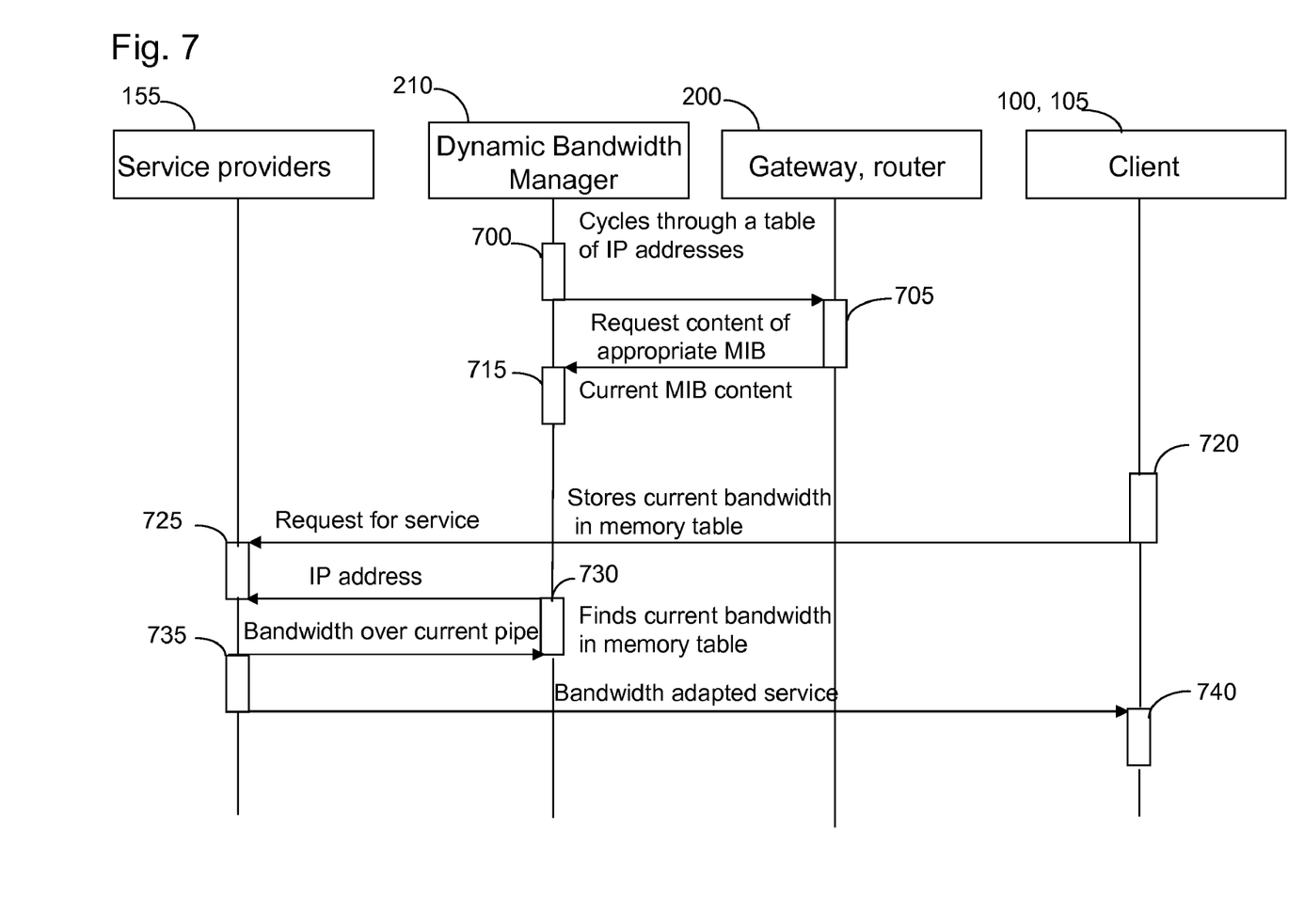
FIG. 7 is a sequence diagram showing the interaction steps of the bandwidth manager operating in an active mode, in accordance with a preferred embodiment of the invention.

In another embodiment and with reference to FIG. 7, the DBM 210 operates in a more active mode, whereby the DBM 210 collects all current SNMP data from all active clients (or a specified list of sub-nets, domain names, etc.) in a configurable time slot and within a specified domain. An advantage of this approach is that the requesting service provider is only required to request the network management data from the data store 420 managed by the DBM 210. This is explained by following the steps in the sequence diagram of FIG. 7.

The sequence commences with the DBM 210 cycling through a table of IP addresses every n number of seconds (sequence steps 700 to 705). For each identified IP address, the DBM 210 requests the network management data stored in the MIB of the SNMP agent at the residential gateway or ADSL router 200, etc. (sequence steps 705 to 710). The DBM 210 calculates the current available bandwidth by following the process steps of FIG. 5 and stores the available bandwidth in the data store 420 (sequence steps 710 to 715).

The client 100, 105, in parallel to the sequence steps of the DBM 210, sends a request to a service provider 155 requesting a media service (sequence steps 715 to 720). The service provider 155 sends the IP address of the requesting client 100, 105 to the DBM 210 and the DBM 210 locates the current bandwidth in the data store 420 (sequence steps 720 to 725). The DBM 210 transmits the available bandwidth to the service provider 155 (sequence steps 725 to 730). The service provider 155, in response to the received available bandwidth, adapts the requested media in order to fulfil the client's request and transmits the adapted content to the requesting client 100, 105 (sequence steps 730 to 735).

What is claimed is:

1. A dynamic bandwidth manager comprising:
    a receiving component for receiving an Internet Protocol (IP) address of an IP connected client requesting access to a multimedia resource from a service provider;
    a requesting component for locating a nearest managed device to the IP connected client and requesting a current network management data set pertaining to the IP connected client from the located managed device, the current network management data set including data indicating an amount of bandwidth currently being used by the client requesting access; and
    a calculation component for retrieving a previously stored network management data set pertaining to the IP connected client and for analysing the current and previously stored network management data sets to calculate an available bandwidth capacity of the IP connected client based on the amount of bandwidth currently being used by the client and an amount of total bandwidth specific to the client that is allotted to the client for use at any one time.

2. The dynamic bandwidth manager of claim 1, wherein the requesting component sends a request to a Simple Network Management Protocol (SNMP) agent located at the nearest managed device for requesting network management data located in a management information database.

3. The dynamic bandwidth manager of claim 1, wherein the current and previously stored network management data sets comprise a number of octets received and transmitted by the IP address over a given time period, and wherein the available bandwidth is calculated by multiplying a sum of a difference between a current and previous bytes of data received and a difference between a current and previous bytes of data transmitted by eight and dividing by a difference between a current and previous timestamp.

4. The dynamic bandwidth manager of claim 1, wherein the requestor component further comprises a limiter for determining a relevance of the previously stored network management data set.

5. The dynamic bandwidth manager of claim 1, wherein the dynamic bandwidth manager communicates with a transcoding component that adapts data content for the multimedia resource to fit the available bandwidth capacity for the IP connected client.

6. The dynamic bandwidth manager of claim 1, wherein the available bandwidth capacity is further based on a subscription for the IP connected client.

7. A method of managing an available bandwidth capacity for an Internet Protocol (IP) connected client, the method comprising:
    receiving, on a computer device, an IP address of the IP connected client;
    locating, on the computer device, a nearest managed device to the IP connected client;
    requesting, on the computer device, a current network management data set pertaining to the IP connected client from the located managed device, the current network management data set including data indicating an amount of bandwidth currently being used by the client requesting access;
    retrieving, on the computer device, a previously stored network management data set pertaining to the IP connected client; and
    analysing, on the computer device, the current and previously stored network management data sets to calculate the available bandwidth capacity of the IP connected client based on the amount of bandwidth currently being used by the client and an amount of total bandwidth specific to the client that is allotted to the client for use at any one time.

8. The method of claim 7, wherein the requesting includes transmitting a request to a Simple Network Management Protocol (SNMP) agent located at the nearest managed device for requesting network management data located in a management information database.

9. The method of claim 7, wherein the requesting includes determining a relevance of the previously stored network management data set.

10. The method of claim 7, wherein the receiving includes:
   receiving an access request for a multimedia service from the IP connected client; and
   obtaining the IP address from the access request.

11. The method of claim 10, further comprising communicating the available bandwidth capacity to a transcoding component for providing data content for the multimedia service.

12. The method of claim 10, further comprising adapting data content for the multimedia service based on the available bandwidth capacity.

13. A computer program stored on a non-transitory computer-readable storage medium, which when executed by a computer system enables the computer system to manage an available bandwidth capacity for an Internet Protocol (IP) connected client, the computer program comprising instructions that enable the computer system to:
   receive an IP address of the IP connected client;
   locate a nearest managed device to the IP connected client;
   request a current network management data set pertaining to the IP connected client from the located managed device, the current network management data set including data indicating an amount of bandwidth currently being used by the client requesting access;
   retrieve a previously stored network management data set pertaining to the IP connected client; and
   analyse the current and previously stored network management data sets to calculate the available bandwidth capacity of the IP connected client based on the amount of bandwidth currently being used by the client and an amount of total bandwidth specific to the client that is allotted to the client for use at any one time.

14. The computer program of claim 13, wherein the instructions that enable the computer system to request enable the computer system to transmit a request to a Simple Network Management Protocol (SNMP) agent located at the nearest managed device for requesting network management data located in a management information database.

15. The computer program of claim 13, wherein the instructions that enable the computer system to request enable the computer system to determine a relevance of the previously stored network management data set.

16. The computer program of claim 13, wherein the instructions that enable the computer system to receive enable the computer system to:
   receive an access request for a multimedia service from the IP connected client; and
   obtain the IP address from the access request.

17. The computer program of claim 16, further comprising instructions that enable the computer system to communicate the available bandwidth capacity to a transcoding component for providing data content for the multimedia service.

18. The computer program of claim 16, further comprising adapting data content for the multimedia service based on the available bandwidth capacity.

19. A method for providing multimedia data content, the method comprising:
   receiving a request for a multimedia service;
   determining an Internet Protocol (IP) address of a requesting IP connected client from the request;
   locating a managed device nearest to the IP connected client;
   requesting a current network management data set pertaining to the IP address from the managed device, the current network management data set including data indicating an amount of bandwidth currently being used by the client requesting access;
   retrieving a previously stored network management data set pertaining to the IP address; and
   analysing the current and previously stored network management data sets to calculate an available bandwidth capacity of the IP connected client based on the amount of bandwidth currently being used by the client and an amount of total bandwidth specific to the client that is allotted to the client for use at any one time.

20. The method of claim 19, further comprising transcoding data content for the multimedia service to adapt the data content to the available bandwidth capacity.

* * * * *